Feb. 23, 1926.

N. A. DAMERON ET AL 1,574,372

CHOKER HOOK

Filed June 6, 1925

Napoleon A. Dameron
and Roy Rhodes,
INVENTORS.

BY David E. Lain,
ATTORNEY.

Patented Feb. 23, 1926.

1,574,372

UNITED STATES PATENT OFFICE.

NAPOLEON A. DAMERON AND ROY RHODES, OF HAMILTON, WASHINGTON.

CHOKER HOOK.

Application filed June 6, 1925. Serial No. 35,345.

*To all whom it may concern:*

Be it known that we, NAPOLEON A. DAMERON and ROY RHODES, citizens of the United States, and residents of Hamilton, in the county of Skagit and State of Washington, have invented a new and useful Choker Hook, of which the following is a specification.

Our invention relates to improvements in choker hooks used in logging, and one of the objects of our improvement is to provide a choker hook which will not become disengaged from its cable during normal use. Another object of our improvement is to provide a choker hook which can not engage with obstacles when trailed on the ground or being projected through the air out of use. Another object of our improvement is to provide a choker hook which is easy of engagement and disengagement with a small allowance of cable slack. And a further object of our improvement is to provide a choker hook designed for production in steel castings of simple structure, great strength, light weight and small cost.

Figure 1:
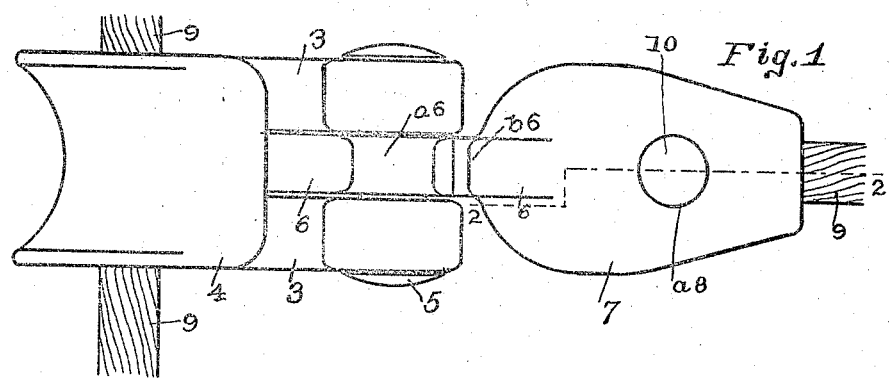
Figure 2:
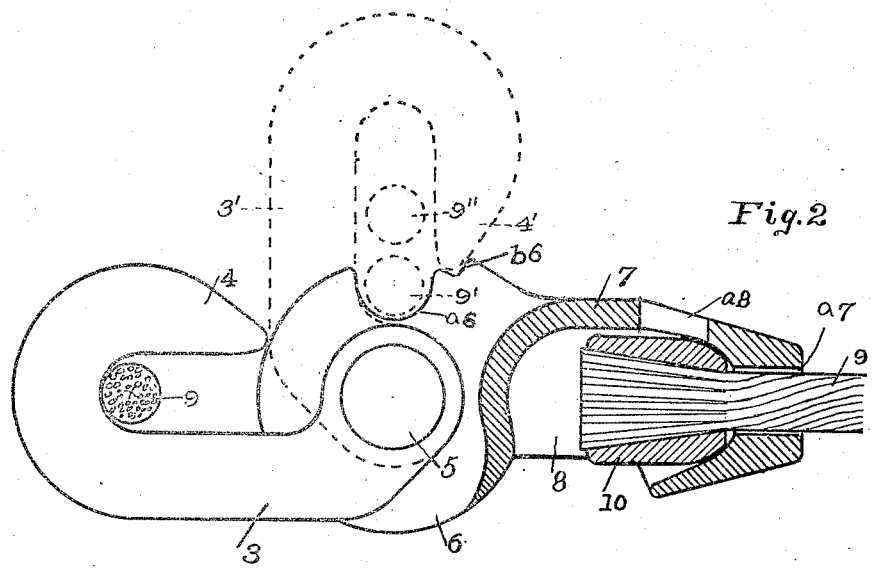

We attain these objects with the mechanism illustrated in the accompanying sheet of drawings, which form a part of this specification, and in which Figure 1 is a plan view of the hook with swivel and choker line attached thereto and engaged therewith, and Fig. 2 is a side elevation of Fig. 1 showing the swivel in section on bent line 2—2 of Fig. 1.

Similar characters refer to similar parts throughout.

More particularly: The hook consists of bifurcated shank 3 and hook point 4. The hook shank is engaged astride swivel shank 6 by pivot 5. Swivel shank 6 is an arcuate disc the periphery of which is concentric about said pivot 5 and is engaged with the hook to cause the point thereof to be proximate to said periphery with such nearness as to prevent the cable from passing therebetween. It may be noted that, for lack of space, the major portion of choker cable 9 is broken away showing only a small length on the end engaged with thimble 10 and a short length near the hook.

In the upper side of swivel shank 6 is transverse notch $a^6$ adapted to receive the choker cable and allow hook point 4 to pass thereover as it lies therein. Stop $b^6$ on shank 6 is located to bear against hook point 4 when said hook is in its dotted-line position at 3', 4' in Fig. 2 with its opening registering with said notch $a^6$. Swivel body 7 has chamber 8 opening through the bottom wall of said body. Cable hole $a^7$ is longitudinal in the end of swivel body 7 and choker cable 9 is passed therethrough and fastened in thimble 10 in said chamber. Thus connected to body 7 cable 9 can revolve in hole $a^7$ thus providing swivelling relation between said cable and the hook. Hole $a^8$ through the upper wall of body 7 allows detritus which may enter chamber 8 an easy escape therefrom when between said walls and thimble 10. The other end of choker cable 9, not shown, is fitted with an eye or a knob for engagement with a bull hook.

In operation: The hook is shown as having choker cable 9 engaged therewith. To disengage the cable the hook is turned on pivot 5 to its dotted-line position at 3', 4' and said cable is passed from its position at 9'' to its position in notch $a^6$ at 9'. Then said hook is swung back on pivot 5 allowing the cable freedom for removal from said notch. To engage the cable with the hook it is placed in notch $a^6$ when hook 3, 4 is in its full-line position and then hook 3, 4 is swung on pivot 5 to its dotted-line position at 3', 4' when cable 9, then at 9' is carried within the hook to 9'' and the hook is swung back on said pivot to its full-line position enclosing the cable within the walls of the hook and swivel shank 6. As illustrated, the hook can swing farther rearward than its full-line position, that is, till shank 3 bears against the swivel enlargement. Thus, there is a wide range in which the hook can be closed against the disengagement of a cable therefrom, and, in practice, it is very exceptional to have the hook swing to its dotted-line position during use even when logging on steep slopes where the logs frequently race forward and, by providing slack in the choker cables, slip out of the choker cable noose when other hooks are used.

The construction herein disclosed which precludes the possibility of the hook being engaged by chance is of greatest importance in modern logging operations in the Northwest. In practice in sky-line logging when the last of a bunch of choker lines is relieved of its load, it frequently happens that the reaction of the somewhat elastic rigging causes the whole bunch of choker lines together with their heavy hooks to be hurled high in the air where some of the hooks may engage with overhead lines if such engagement is possible. Such chance engagements between hooks and rigging are always troublesome and sometimes serious.

Having thus disclosed our invention, what we claim as new and desire to secure by Letters Patent is,—

In combination, a hook swivel having a shank with an arcuate end said arcuate end having a notch in the periphery thereof adapted to receive a cable, a stop lug on said shank adjacent said notch, and a hook pivoted to said swivel shank concentric with the periphery of said arcuate shank end with the point of said hook proximate to the periphery of said arc adapted to swing on said pivot and bear against said lug when the said hook registers with said notch said hook nonengageable with said cable except manually through said notch.

NAPOLEON A. DAMERON.
ROY RHODES.